(12) United States Patent
Jomori et al.

(10) Patent No.: US 8,129,070 B2
(45) Date of Patent: Mar. 6, 2012

(54) FUEL CELL

(75) Inventors: Shinji Jomori, Susono (JP); Naoki Takehiro, Sunto-gun (JP); Tatsuya Arai, Susono (JP); Keiichi Kaneko, Fuji (JP); Takumi Taniguchi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/132,554

(22) PCT Filed: Dec. 12, 2008

(86) PCT No.: PCT/JP2008/072633
§ 371 (c)(1),
(2), (4) Date: Jun. 2, 2011

(87) PCT Pub. No.: WO2010/067452
PCT Pub. Date: Jun. 17, 2010

(65) Prior Publication Data
US 2011/0236787 A1    Sep. 29, 2011

(51) Int. Cl.
*H01M 8/10* (2006.01)
(52) U.S. Cl. .......... 429/482; 429/400; 429/479
(58) Field of Classification Search .......... 429/482
See application file for complete search history.

(56) References Cited

FOREIGN PATENT DOCUMENTS

| JP | 59-027465 A | 2/1984 |
|---|---|---|
| JP | 11-016591 A | 1/1999 |
| JP | 2005-071763 A | 3/2005 |
| JP | 2005-141979 A | 6/2005 |
| JP | 2005141979 A * | 6/2005 |
| JP | 2005-190983 A | 7/2005 |
| JP | 2005-322595 A | 11/2005 |
| JP | 2005322595 A * | 11/2005 |
| JP | 2007-207725 A | 8/2007 |
| JP | 2009-110838 A | 5/2009 |

OTHER PUBLICATIONS

International Search Report of PCT/JP2008/072633 issued Aug. 11, 2009.

* cited by examiner

*Primary Examiner* — Barbara Gilliam
*Assistant Examiner* — Gary Harris
(74) *Attorney, Agent, or Firm* — Kenyon & Kenyon LLP

(57) ABSTRACT

The present invention provides a fuel cell having obstructed passages, which is capable of inhibiting the occurrence of flooding. The fuel cell comprises: a stacked body comprising at least a membrane electrode assembly; and a pair of separators sandwiching the stacked body. A face of the stacked body side of the separator is provided with inlet passage(s) through which reaction gas to be supplied to the stacked body passes and outlet passage(s) through which reaction gas having passed the stacked body passes. The inlet passage is obstructed at a downstream end of the reaction gas to be supplied to the stacked body and the outlet passage is obstructed at an upstream end of the reaction gas having passed through the stacked body. The inlet passage and the outlet passage is arranged separately from each other, and the inlet passage is arranged on both ends of the face of the stacked body side of the separator in the passage width direction of the inlet passage and the outlet passage.

1 Claim, 4 Drawing Sheets

FUEL CELL

This is a 371 national phase application of PCT/JP2008/072633 filed 12 Dec. 2008, the content of which is incorporated herein by reference.

TECHNICAL FIELD

The present invention relates to a fuel cell; more particularly, it relates to a fuel cell having an obstructed passage where an inlet port or an outlet port of passages are obstructed.

BACKGROUND ART

A fuel cell is an apparatus which generates electrochemical reaction in a membrane electrode assembly (hereinafter, referred to as "MEA".) comprising an electrolyte layer (hereinafter, referred to as "electrolyte membrane".) and electrodes (i.e. an anode catalytic layer and a cathode catalytic layer) arranged on both sides of the electrolyte membrane, and which extracts electrical energy generated by the electrochemical reaction to outside. Among various fuel cells, solid polymer electrolyte fuel cell (hereinafter, referred to as "PEFC".) used for domestic cogeneration system, automobiles, and so on can be actuated in a low temperature region. Because of its high energy conversion efficiency, short start-up time, and small-sized and lightweight system, the PEFC has received attention as a power source of a battery car or a portable power supply.

A unit cell of the PEFC comprises a MEA and a pair of current collectors (separators) sandwiching a stacked body including the MEA; the MEA contains a proton conductive polymer which has proton conductivity. During the operation of PEFC, a hydrogen-containing gas (hereinafter, referred to as "hydrogen".) is supplied to the anode; meanwhile, an oxygen-containing gas (hereinafter, referred to as "air".) is supplied to the cathode. The hydrogen supplied to the anode is separated into proton and electron under the action of catalyst contained in the anode catalytic layer; the proton generated from the hydrogen reaches the cathode catalytic layer through the anode catalytic layer and the electrolyte membrane. On the other hand, the electron reaches the cathode catalytic layer through an external circuit; by having such a process, it is possible to extract the electrical energy. Then, the proton and the electron both reached the cathode catalytic layer react with oxygen contained in the air which has been supplied to the cathode catalytic layer to produce water under action of catalyst contained in the cathode catalyst layer.

By keeping soaking the proton conductive polymer contained in the MEA with water, it is possible to reduce the proton conductive resistance. Because of this, during the operation of PEFC, it is necessary to keep soaking the MEA with water. However, when water of which amount exceeds the drainage capacity of the unit cells is produced during the operation of the PEFC, liquid water is accumulated in, for example, passages where hydrogen and air to be supplied to the MEA are passing through (hereinafter, it may be merely referred to as "passage".), which becomes a state called flooding. When flooding occurs, frequency of electrochemical reaction decreases due to the inhibition of diffusion of the reaction gases; thereby power generation performance of the PEFC declines. Hence, so as to improve the power generation performance of the PEFC, it is necessary to prevent the occurrence of flooding.

As an art to prevent the occurrence of flooding, so far, PEFCs having passages of which inlet port or outlet port is obstructed have been developed. With the mode having the obstructed passages, it is possible to diffuse a larger amount of reaction gases even in a region of the stacked body facing a portion of a separator located between the adjacent passages (hereinafter, referred to as "projection portion".). Accordingly, by this mode, it is possible to improve the drainage performance.

For example, Patent document 1 discloses an art regarding PEFC having an obstructed passage. The Patent document 1 discloses an embodiment where the number of the obstructed passage (hereinafter, the obstructed passage may be referred to as "inlet passage".) through which gasses to be supplied to the MEA pass and the number of the obstructed passage (hereinafter, the obstructed passage may be referred to as "outlet passage".) through which the gasses having been passed through the MEA pass are the same.

Patent Document 1: Japanese Patent Application Laid-Open (JP-A) No. 11-016591

DISCLOSURE OF THE INVENTION

Problems to be Solved by the Invention

By the art shown in the Patent document 1, since the obstructed passage is formed in a current collector (separator), it is possible to diffuse a larger amount of reaction gasses even in a region of the stacked body facing the projection portion. Therefore, it is presumably possible to inhibit accumulation of the liquid water in the region of the stacked body facing the projection portion. Here, during high-power operation of PEFC for example, the unit cells tends to be hotter than the outside air; so, the high-temperature unit cells discharge a large amount of heat from its outer periphery. Therefore, the outer periphery of the unit cell tends to be exposed to low-temperature environment compared with the central region of the unit cell. The liquid water is easily accumulated in the region exposed to the low-temperature environment; so, during high-power operation of the PEFC, flooding tends to occur at the outer periphery of the unit cell. In general, in a PEFC having obstructed passages, the inlet passages and the outlet passages are alternately arranged. With this arrangement, in the art shown in the Patent document 1 where the number of the inlet passage and the number of the outlet passage are the same, it is necessary to arrange one inlet passage on one end of and one outlet passage on the other end of the obstructed passages in a separator. In a region where the outermost inlet passage is located, a gas flows from the inlet passage to the adjacent outlet passage. Because of this, in the region of the stacked body facing the inlet passage, liquid water is hard to be accumulated. On the other hand, in the region where the outermost outlet passage is located, there is no gas flow from a portion outside the outermost outlet passage to the outermost outlet passage. Due to this, in the region of the stacked body facing the outlet passages, liquid water is easily accumulated (namely, flooding occurs easily.). That is, the art shown in the Patent document 1 easily causes flooding particularly at the outer periphery of the unit cell.

Accordingly, an object of the present invention is to provide a fuel cell having obstructed passages, which is capable of inhibiting occurrence of flooding.

Means for Solving the Problems

In order to solve the above problem, the present invention takes the following means. In other words, the present invention is a fuel cell comprising: a stacked body comprising at least a membrane electrode assembly; and a pair of separators sandwiching the stacked body, a face of the stacked body side of the separator being provided with inlet passage(s) through which reaction gas to be supplied to the stacked body passes and outlet passage(s) through which reaction gas having passed the stacked body passes, the inlet passage being obstructed at a downstream end of the reaction gas to be supplied to the stacked body and the outlet passage being obstructed at an upstream end of the reaction gas having passed through the stacked body, the inlet passage and the outlet passage being arranged separately from each other, and the inlet passage being arranged on both ends of the face of the stacked body side of the separator in the passage width direction of the inlet passage and the outlet passage, number of the inlet passage provided to one of the separators being larger than that of the outlet passage provided to the separator, the inlet passage and the outlet passages are linear, and the flow direction of reaction gas passing the anode side of the stacked body and the flow direction of the reaction gas passing the cathode side of the stacked body being opposite each other.

Here, in the invention, "a stacked body comprising at least a membrane electrode assembly (MEA)" means a concept including: a stacked body formed of a membrane electrode assembly; and a stacked body comprising a membrane electrode assembly and other elements. As "other elements" provided to the stacked body, among elements sandwiched by a pair of separators in the unit cell of a PEFC, known elements (for example, gas diffusion layer disposed between the MEA and a separator) except for MEA can be used.

In addition, in the invention, the phrases "reaction gas to be supplied to the stacked body" and "reaction gas having been passed the stacked body" means a hydrogen-containing gas or an oxygen-containing gas. Moreover, in the invention, the phrase "reaction gas passes through" means that at least a reaction gas passes; this allows the passing of water and so on produced by power generation with the fuel cell, in addition to the reaction gas.

EFFECTS OF THE INVENTION

According to the fuel cell of the present invention, inlet passage is arranged on both ends of the face of the stacked body side of the separator in the passage width direction of the inlet passage and the outlet passage. Therefore, by using the fuel cell of the invention, it is possible to inhibit occurrence of flooding in the entire region (including its outer periphery) of the unit cell.

In addition, in the fuel cell of the invention, by setting the number of the inlet passage provided to one of the separators larger than that of the outlet passage provided to the separator, occurrence of flooding can be easily inhibited.

Figure 1:
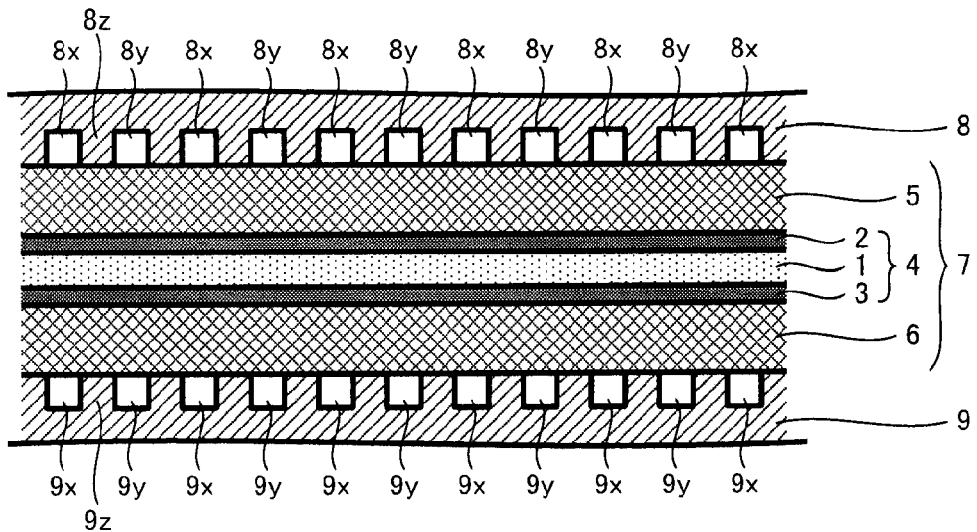
FIG. 1 is a cross-sectional view showing an embodiment of a fuel cell 10 of the present invention.

DESCRIPTION OF THE REFERENCE NUMERALS 1 electrolyte membrane
2 anode catalyst layer
3 cathode catalyst layer
4 MEA (membrane electrode assembly)
5 gas diffusion layer
6 gas diffusion layer
7 stacked body
8 separator
8$x$ inlet passage
8$xa$ inlet passage
8$xb$ inlet passage
8$xc$ inlet passage
8$xd$ inlet passage
8$xe$ inlet passage
8$xf$ inlet passage
8$y$ outlet passage
8$ya$ outlet passage
8$yb$ outlet passage
8$yc$ outlet passage
8$yd$ outlet passage
8$ye$ outlet passage
8$z$ projection portion
9 separator
9$x$ inlet passage
9$xa$ inlet passage
9$xb$ inlet passage
9$xc$ inlet passage
9$xd$ inlet passage
9$xe$ inlet passage
9$xf$ inlet passage
9$y$ outlet passage
9$ya$ outlet passage
9$yb$ outlet passage
9$yc$ outlet passage
9$yd$ outlet passage
9$ye$ outlet passage
9$z$ projection portion
10 fuel cell
98 separator
98$x$ inlet passage
98$y$ outlet passage
99 separator
99$x$ inlet passage
99$y$ outlet passage

BEST MODE FOR CARRYING OUT THE INVENTION

Hereinafter, the present invention will be described with reference to the drawings. It should be noted that the modes shown below are examples of the present invention, so that the invention is not limited by the modes.

FIG. 1 is a cross-sectional view showing an embodiment of a fuel cell of the present invention. The vertical direction of the drawing paper of FIG. 1 is the thickness direction of the membrane electrode assembly; the front-to-back direction of the drawing sheet of FIG. 1 is the flow direction of a reaction gas to be supplied to the membrane electrode assembly.

As shown in FIG. 1, the fuel cell 10 of the invention comprises: a stacked body 7 which comprises: a MEA 4 comprising an electrolyte membrane 1, an anode catalyst layer 2 formed on one face of the electrolyte membrane 1, and a cathode catalyst layer 3 formed on the other face (opposite to the face where the anode catalyst layer 2 is formed) of the electrolyte membrane 1; a gas diffusion layer 5 disposed on the outer face of the anode catalyst layer 2; and a gas diffusion layer 6 disposed on the outer face of the cathode catalyst layer 3. The fuel cell 10 further comprises: a separator 8 disposed on the outer face of the gas diffusion layer 5; and a separator 9 disposed on the outer face of the gas diffusion layer 6. The gas diffusion layer 5 side face of the separator 8 is provided with inlet passages 8x, 8x, . . . and outlet passages 8y, 8y, . . . through which hydrogen passes; the gas diffusion layer 6 side face of the separator 9 is provided with inlet passages 9x, 9x, . . . and outlet passages 9y, 9y, . . . through which air passes.

Figure 2:
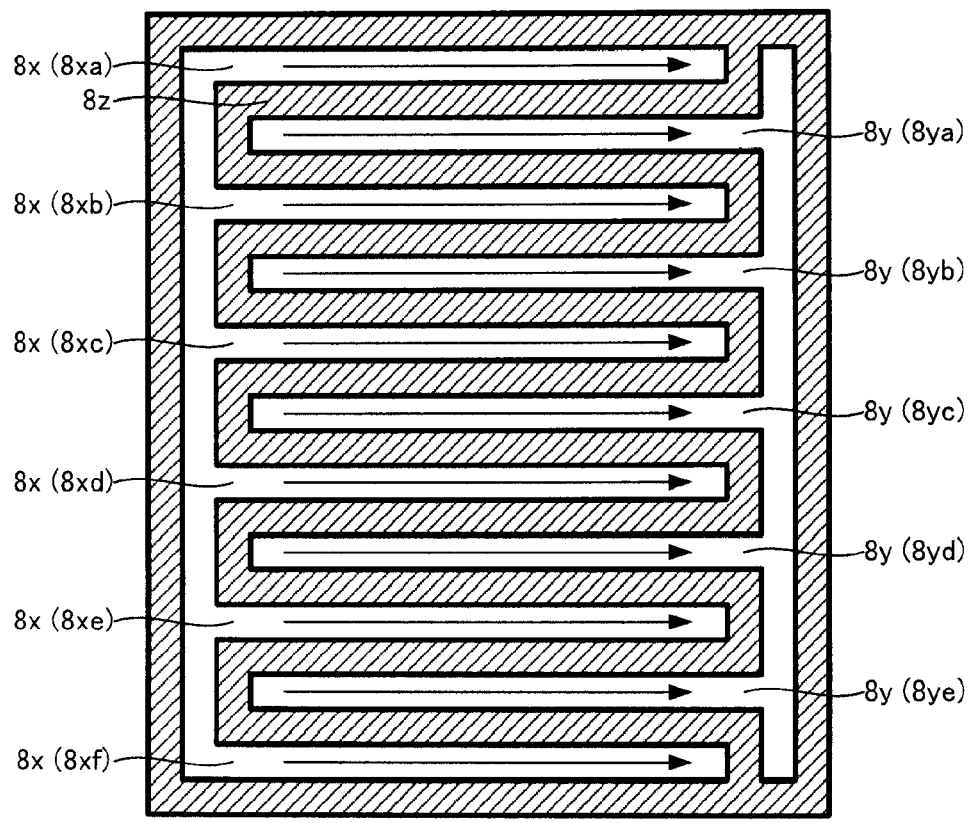
FIG. 2 is a plan view schematically showing an embodiment of a separator 8.
Figure 3:
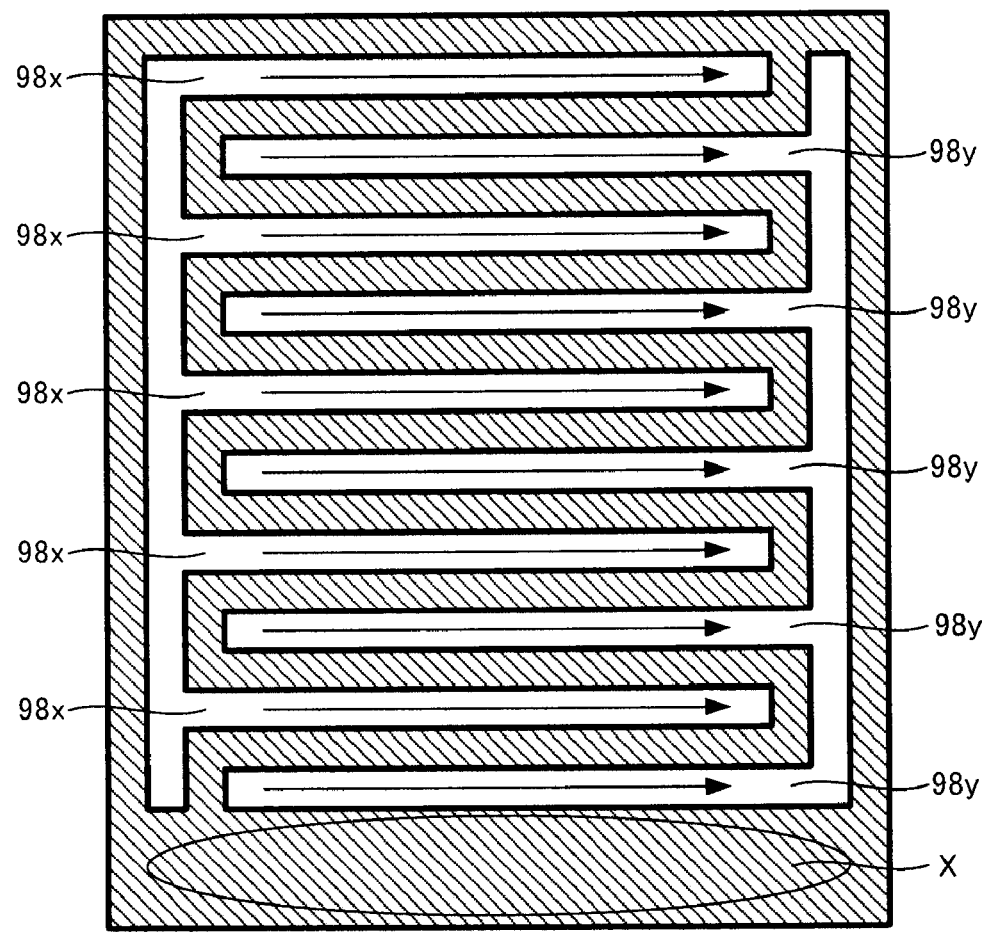
FIG. 3 is a plan view schematically showing an embodiment of a conventional separator 98 which has obstructed passages and is provided to a fuel cell.

FIG. 2 is a plan view schematically showing an embodiment of a separator 8. The vertical direction of the drawing paper of FIG. 2 is the passage width direction (hereinafter, merely referred to as "passage width direction".) of the inlet passages 8x, 8x, . . . and outlet passages 8y, 8y, . . . . The arrows in FIG. 2 show the flow direction of hydrogen; the left side of FIG. 2 corresponds to the front side of FIG. 1. In the following description, the inlet passages 8x, 8x, . . . shown in FIG. 2 may be called inlet passages 8xa, 8xb, . . . , 8xf in the order from the top to the bottom of FIG. 2. In the same manner, the outlet passages 8y, 8y, . . . shown in FIG. 2 may be called outlet passages 8ya, 8yb, . . . 8ye in the order from the top to the bottom of FIG. 2. FIG. 3 is a plan view schematically showing an embodiment of a conventional separator 98 which has obstructed passages and is disposed on the outer face of the anode catalyst layer of a fuel cell. The arrows in FIG. 3 show the flow direction of hydrogen. Below, the description of the fuel cell 10 will be continued with reference to FIGS. 1 to 3.

As shown in FIG. 2, the inlet passages 8x, 8x, . . . are obstructed at a downstream end of hydrogen; while, the outlet passages 8y, 8y, . . . are obstructed at an upstream end of hydrogen. As shown in FIG. 2, the inlet passages 8x, 8x, . . . and the outlet passages 8y, 8y, . . . both provided to the separator 8 are arranged alternately and separately from each other, so the inlet passages 8x, 8x, . . . and the outlet passages 8y, 8y, . . . are not connected to each other. Because of this, in the fuel cell 10, the hydrogen supplied through the inlet passages 8x, 8x, . . . diffuses into the gas diffusion layer 5 and the anode catalyst layer 2, and then, the hydrogen having passed through the gas diffusion layer 5 and the anode catalyst layer 2 reaches the outlet passages 8y, 8y, . . . . Accordingly, by the fuel cell 10, it is possible to easily diffuse hydrogen even in the region of the gas diffusion layer 5 and the anode catalyst layer 2 facing a projection portion 8z between the neighboring inlet passage 8x and outlet passage 8y (hereinafter, referred to as "projection portion 8z facing region"). Accordingly, by the fuel cell 10, it is possible to inhibit accumulation of liquid water in the projection portion 8z facing region; thereby possible to prevent occurrence of flooding.

Moreover, as shown in FIG. 2, in the separator 8 of the fuel cell 10, the number of inlet passages 8x, 8x, . . . is larger than that of the outlet passages 8y, 8y, . . . ; so, the inlet passage 8xa and the inlet passage 8xf are respectively arranged on each end of the separator 8 in the passage width direction. In the fuel cell 10 having such a structure, there exists a flow of hydrogen from the inlet passage 8xa to the outlet passage 8ya; there also exists a flow of hydrogen from the inlet passage 8xf to the outlet passage 8ye. Whereas, as shown in FIG. 3, the separator 98 comprises inlet passages 98x, 98x, . . . and the outlet passages 98y, 98y, . . . ; the conventional fuel cell is provided with the same number of the outlet passages 98y, 98y, . . . and the inlet passages 98x, 98x, . . . . Due to this, when arranging the inlet passage 98x at the upper end of the separator 98 in FIG. 3, the outlet passage 98y is arranged at the lower end of the separator 98 in FIG. 3. With this structure, there is no hydrogen flow from the region below the outlet passage 98y located at the lower end of the separator 98 in FIG. 3 to the outlet passage 98y. As a consequence, in the conventional fuel cell, liquid water is easily accumulated in, for example, the gas diffusion layer and the anode catalyst layer (i.e. the outer periphery of the unit cell.) both facing the region shown by X in FIG. 3 (region X); thereby flooding occurs easily. On the other hand, in the fuel cell 10, the inlet passage 8xa and the inlet passage 8xf are respectively arranged on each end of the separator 8 in the passage width direction. When the amount of hydrogen passing through each inlet passage 8x, 8x, . . . is defined as G1, it is assumed that the hydrogen having passed through the inlet passage 8xa diffuses toward the only one outlet passage 8ya adjacent to the inlet passage 8xa. Because of this, when defining the amount of hydrogen consumed in the anode catalyst layer 2 during transfer from one inlet passage 8x to the outlet passage 8y adjacent to the one inlet passage 8x as G2, the amount of hydrogen flowing from the inlet passage 8xa to the outlet passage 8ya can be expressed by "G1−G2". In the same manner, the amount of hydrogen moving from the inlet passage 8xf to the outlet passage 8ye can also be expressed by "G1−G2". Other than the inlet passage 8xa and the inlet passage 8xf, the inlet passages 8xb, 8xc, 8xd, 8xe are arranged so that each of the outlet passages 8ya, 8yb, . . . , 8ye are arranged therebetween in the mentioned order. Because of this, the amount of hydrogen moving from each of the inlet passages 8xb, 8xc, 8xd, 8xe to each of the adjacent outlet passages 8ya, 8yb, . . . , 8ye can be expressed by "(G1−G2)/2". In other words, with regard to the fuel cell 10, the amount of hydrogen from the inlet passage 8xa to the outlet passage 8ya and the amount of hydrogen from the inlet passage 8xf to the outlet passage 8ye can be twice as much as that from each of the inlet passages 8xb, 8xc, 8xd, 8xe to each of the outlet passages 8ya, 8yb, . . . , 8ye. In this way, by the fuel cell 10, it is possible to increase the amount of hydrogen passing through the outer periphery of the unit cell; thereby, it is possible to increase the amount of liquid water removed from the outer periphery of the unit cell. Accordingly, by the fuel cell 10, it is possible to prevent occurrence of flooding in the entire area (including its outer periphery) of the unit cell.

Figure 4:
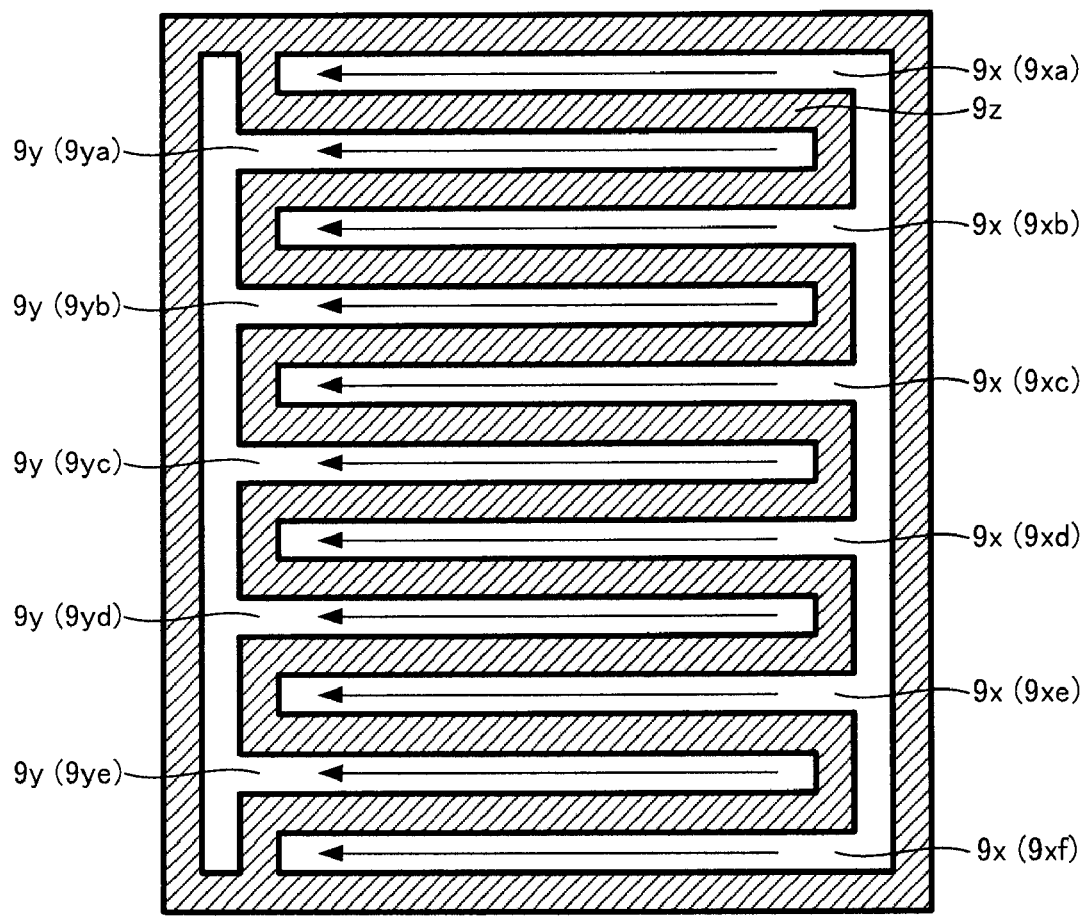
FIG. 4 is a plan view schematically showing an embodiment of a separator 9.
Figure 5:
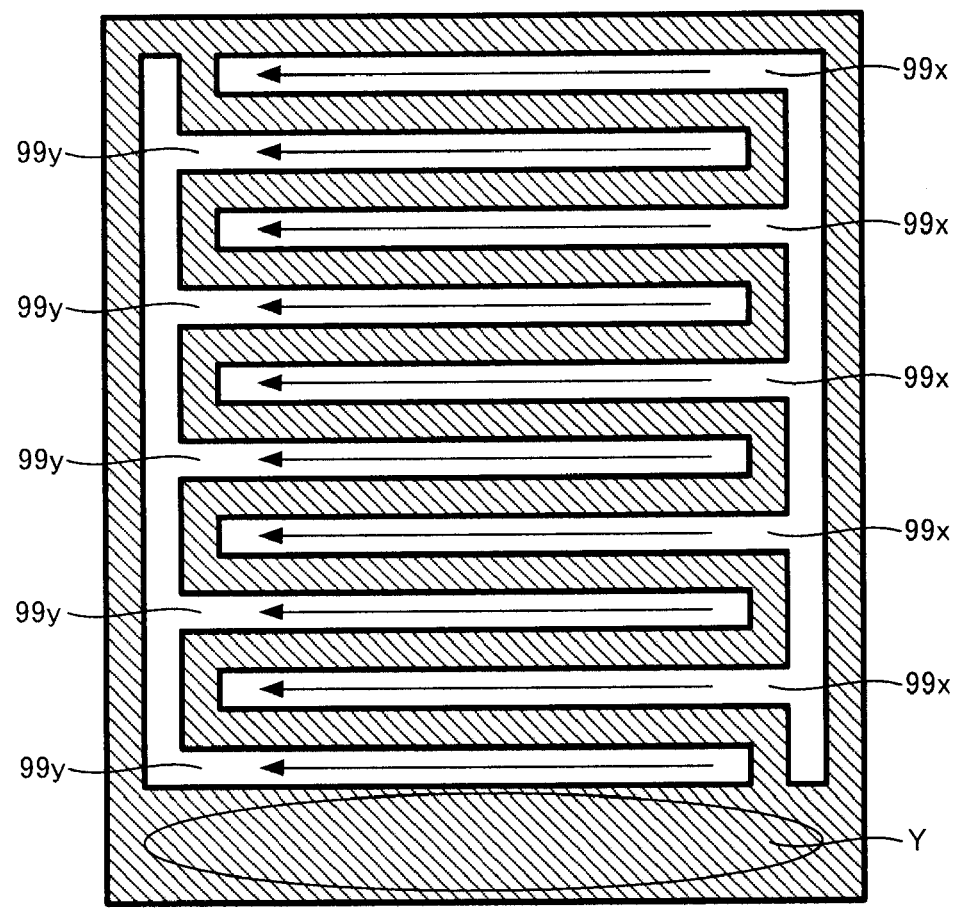
FIG. 5 is a plan view schematically showing an embodiment of a conventional separator 99 which has obstructed passages and is provided to a fuel cell.

FIG. 4 is a plan view schematically showing an embodiment of a separator 9. The vertical direction of the drawing paper of FIG. 4 is the passage width direction (hereinafter, merely referred to as "passage width direction".) of the inlet passages 9x, 9x, . . . and outlet passages 9y, 9y, . . . . The arrows in FIG. 4 show the flow direction of air; the left side of FIG. 4 corresponds to the front side of FIG. 1. In the following description, the inlet passages 9x, 9x, . . . shown in FIG. 4 may be called inlet passages 9xa, 9xb, . . . , 9xf in the order from the top to the bottom of FIG. 4. In the same manner, the outlet passages 9y, 9y, . . . shown in FIG. 4 may be called outlet passages 9ya, 9yb, . . . 9ye in the order from the top to the bottom of FIG. 4. FIG. 5 is a plan view schematically showing an embodiment of a conventional separator 99 which has obstructed passages and is provided to the cathode catalyst layer side of a fuel cell. The arrows in FIG. 5 show the flow direction of the air. Below, the description of the fuel cell 10 will be continued with reference to FIGS. 1, 4, and 5.

As shown in FIG. 4, the inlet passages 9x, 9x, . . . are obstructed at a downstream end of air; while, the outlet passages 9y, 9y, . . . are obstructed at an upstream end of air. As shown in FIG. 4, the inlet passages 9x, 9x, . . . and the outlet passages 9y, 9y, . . . both provided to the separator 9 are arranged alternately and separately from each other, so the inlet passages 8x, 8x, . . . and the outlet passages 8y, 8y, . . . are not connected to each other. Because of this, in the fuel cell 10, the air supplied through the inlet passages 9x, 9x, ... diffuses into the gas diffusion layer 6 and the cathode catalyst layer 3, and then, the air having passed through the gas diffusion layer 6 and the cathode catalyst layer 3 reaches the outlet passages 9y, 9y, .... Accordingly, by the fuel cell 10, it is possible to easily diffuse the air even in the region of the gas diffusion layer 6 and the cathode catalyst layer 3 facing a projection portion 9z between the neighboring inlet passage 9x, 9x, ... and outlet passage 9y, 9y, ... (hereinafter, referred to as "projection portion 9z facing region"). Accordingly, by the fuel cell 10, it is possible to inhibit accumulation of liquid water in the projection portion 9z facing region; thereby possible to prevent occurrence of flooding.

Moreover, as shown in FIG. 4, in the separator 9 of the fuel cell 10, the number of inlet passages 9x, 9x, ... is larger than that of the outlet passages 9y, 9y, ...; so, the inlet passage 9xa and the inlet passage 9xf are respectively arranged on each end of the separator 9 in the passage width direction. In the fuel cell 10 having such a structure, there exists a flow of air from the inlet passage 9xa to the outlet passage 9ya; there also exists a flow of air from the inlet passage 9xf to the outlet passage 9ye. Whereas, as shown in FIG. 5, the separator 99 comprises inlet passages 99x, 99x, ... and the outlet passages 99y, 99y, ...; the conventional fuel cell is provided with the same number of the outlet passages 99y, 99y, ... and the inlet passages 99x, 99x, .... Due to this, when arranging the inlet passage 99x at the upper end of the separator 99 in FIG. 5, the outlet passage 99y is arranged at the lower end of the separator 99 in FIG. 5. With this structure, there is no air flow from the region below the outlet passage 99y located at the lower end of the separator 99 in FIG. 5 to the outlet passage 99y. As a consequence, in the conventional fuel cell, liquid water is easily accumulated in, for example, the gas diffusion layer and the cathode catalyst layer (i.e. the outer periphery of the unit cell.) both facing the region shown by Y in FIG. 5 (region Y); thereby flooding occurs easily. On the other hand, in the fuel cell 10, the inlet passage 9xa and the inlet passage 9xf are respectively arranged on each end of the separator 9 in the passage width direction. When the amount of air passing through each inlet passage 9x, 9x, ... is defined as G3, it is assumed that the air having passed through the inlet passage 9xa diffuses toward the only one outlet passage 9ya adjacent to the inlet passage 9xa. Because of this, when defining the amount of air consumed in the cathode catalyst layer 3 during transfer from one inlet passage 9x to the outlet passage 9y adjacent to the one inlet passage 9x as G4, the amount of air flowing from the inlet passage 9xa to the outlet passage 9ya can be expressed by "G3−G4". In the same manner, the amount of air moving from the inlet passage 9xf to the outlet passage 9ye can also be expressed by "G3−G4". Other than the inlet passage 9xa and the inlet passage 9xf, the inlet passages 9xb, 9xc, 9xd, 9xe are arranged so that each of the outlet passages 9ya, 9yb, ..., 9ye are arranged therebetween in the mentioned order. Because of this, the amount of air moving from each of the inlet passages 9xb, 9xc, 9xd, 9xe to each of the adjacent outlet passages 9ya, 9yb, ..., 9ye, can be expressed by "(G3−G4)/2". In other words, with regard to the fuel cell 10, the amount of air from the inlet passage 9xa to the outlet passage 9ya and the amount of air from the inlet passage 9xf to the outlet passage 9ye, can be twice as much as that from each of the inlet passages 9xb, 9xc, 9xd, 9xe to each of the outlet passages 9ya, 9yb, ..., 9ye. In this way, by the fuel cell 10, it is possible to increase the amount of air passing through the outer periphery of the unit cell; thereby, it is possible to increase the amount of liquid water removed from the outer periphery of the unit cell. Accordingly, by the fuel cell 10, it is possible to prevent occurrence of flooding in the entire (including its outer periphery) area of the unit cell.

The above descriptions regarding the fuel cell 10 shows an embodiment where the separator, in which the inlet passage is arranged on both ends of the face of the separator in the passage width direction, is provided at both electrode sides as the separator 8 disposed in a manner to face the anode catalyst layer 2 and the separator 9 disposed in a manner to face the cathode catalyst layer 3. However, the present invention is not limited to this embodiment. The separator in which the inlet passage is arranged on both ends of the face of the separator in the passage width direction may be provided at one electrode side only, namely the side to face the anode catalyst layer or the side to face the cathode catalyst layer.

During the power generation of the fuel cell, water is produced in the cathode catalyst layer, so it is assumed that flooding occurs easily at the cathode catalyst layer side. Nevertheless, it is also assumed that the flooding is likely caused at the anode catalyst layer side by diffusion of the liquid water existing at the cathode catalyst layer side toward the anode catalyst layer side through the electrolyte membrane (reverse diffusion). Therefore, in the present invention, the separator in which the inlet passage is arranged on both ends of the face of the separator in the passage width direction can be provided at least at the side facing the cathode catalyst layer; it is preferably provided at the sides of both electrode.

In addition, the above descriptions regarding the fuel cell 10 shows a separator 8 provided with the substantially linear inlet passages 8x, 8x, ... and the substantially linear outlet passages 8y, 8y, ... and also a separator 9 provided with the substantially linear inlet passages 9x, 9x, ... and the substantially linear outlet passages 9y, 9y, ...; however the fuel cell of the present invention is not limited to the embodiment. Each of the inlet passages and the outlet passages provided to the fuel cell of the invention may be curved (for example, serpentine shape).

Further, in the fuel cell 10 of the invention, the number of the inlet passage and the outlet passage provided to the separator is not particularly limited as long as the inlet passage is arranged on both ends of the separator in the passage width direction. The number of the inlet passage and the outlet passage can be adequately determined depending on the size of the anode catalyst layer as well as the width of the inlet passage and outlet passage and projection portion. In the fuel cell of the invention, the number of the inlet passage may be six, while the number of the outlet passage may be five.

Still further, when applying the present invention to a fuel cell comprising a cell stacked body in which a plurality of unit cells are stacked, the cell stacked body may be constituted by only unit cells each having separator in which inlet passage is arranged on both ends of the separator in the passage width direction or the unit cell may be disposed at a part of the cell stacked body. When disposing the unit cell at a part of the cell stacked body, the location is not particularly limited; it is preferable to dispose the unit cell having a separator, in which inlet passage is arranged on both ends thereof, at the end of the cell stacked body where is easily exposed by a low-temperature environment compared with the unit cell located at the center of the cell stacked body.

Industrial Applicability

The fuel cell of the present invention can be used, for example, for a power source of battery car or a portable power supply.

The invention claimed is:

1. A fuel cell comprising: a stacked body comprising at least a membrane electrode assembly; and a pair of separators sandwiching the stacked body, wherein:

a face of the stacked body side of one of the pair of separators is provided with at least two inlet passages through which reaction gas to be supplied to the stacked body passes and at least one outlet passage through which reaction gas having passed the stacked body passes, the at least two inlet passages are each obstructed at a downstream end of the reaction gas to be supplied to the stacked body, and the at least one outlet passage is obstructed at an upstream end of the reaction gas having passed through the stacked body, the at least two inlet passages and the at least one outlet passage are arranged separately from each other, the at least two inlet passages are arranged on both ends of the face of the stacked body side of the one of the pair of separators in the passage width direction of the inlet passage and the outlet passage, the number of the inlet passages provided on the one of the pair of separators is larger than that of the outlet passages provided on the one separator, the inlet passages and the outlet passages are linear, the flow direction of reaction gas passing the anode side of the stacked body and the flow direction of reaction gas passing the cathode side of the stacked body are opposite each other, and the flow direction of the reaction gas is in a single direction along substantially the entire length of the passage through which it travels.

* * * * *